United States Patent
Storm

(10) Patent No.: US 11,953,986 B2
(45) Date of Patent: Apr. 9, 2024

(54) SELECTABLE SIGNAL, LOGGING, AND STATE EXTRACTION

(71) Applicant: Micron Technology, Inc., Boise, ID (US)

(72) Inventor: Shawn Storm, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/856,668

(22) Filed: Jul. 1, 2022

(65) Prior Publication Data

US 2024/0004752 A1    Jan. 4, 2024

(51) Int. Cl.
     *G06F 11/00*      (2006.01)
     *G06F 11/10*      (2006.01)

(52) U.S. Cl.
     CPC ................. *G06F 11/1008* (2013.01)

(58) Field of Classification Search
     CPC .................................................. G06F 11/1008
     USPC ........................................................ 714/1–57
     See application file for complete search history.

(56) References Cited

U.S. PATENT DOCUMENTS

| | | | |
|---|---|---|---|
| 4,685,047 A | 8/1987 | Phillips | |
| 6,629,170 B1* | 9/2003 | Davidson | G06F 11/348 710/262 |
| 7,098,642 B2 | 8/2006 | Rose | |
| 7,233,875 B2* | 6/2007 | Huang | H04L 1/243 714/25 |
| 9,262,254 B2* | 2/2016 | Bertosa | H04L 67/12 |
| 2001/0037477 A1* | 11/2001 | Veenstra | G01R 31/318516 714/E11.169 |
| 2003/0028829 A1* | 2/2003 | Slater | H04B 1/74 714/47.3 |
| 2005/0022061 A1* | 1/2005 | Ozasa | H04N 5/775 386/E5.07 |
| 2005/0125754 A1* | 6/2005 | Schubert | G01R 31/318364 716/102 |
| 2007/0214394 A1* | 9/2007 | Gross | G06F 11/203 714/47.1 |
| 2008/0162071 A1* | 7/2008 | Stevens | G01R 31/318569 714/E11.16 |
| 2010/0191933 A1* | 7/2010 | Sonnekalb | G06F 12/1416 712/E9.007 |
| 2013/0166952 A1* | 6/2013 | Schon | G06F 9/3861 714/E11.138 |
| 2015/0026513 A1* | 1/2015 | Pasquale | G06F 12/0246 714/6.21 |
| 2015/0146872 A1* | 5/2015 | Baek | G06F 11/08 380/270 |
| 2021/0073042 A1* | 3/2021 | Duluk, Jr. | G06F 9/5027 |

\* cited by examiner

*Primary Examiner* — Sarai E Butler
(74) *Attorney, Agent, or Firm* — Brooks, Cameron & Huebsch, PLLC

(57) ABSTRACT

A plurality of signals within a memory sub-system are analyzed by a signal analyzer component. Relevant signals among the plurality of signals are determined by the signal analyzer component such that the relevant signals comprise a subset of signals among the plurality of signals. Information corresponding to the relevant signals is sampled by the signal analyzer component and the signal analyzer component is responsible for extracting the information corresponding to the relevant signals among the plurality of signals.

24 Claims, 5 Drawing Sheets

SELECTABLE SIGNAL, LOGGING, AND STATE EXTRACTION

TECHNICAL FIELD

Embodiments of the disclosure relate generally to memory sub-systems, and more specifically, relate to selectable signal, logging, and state extraction.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
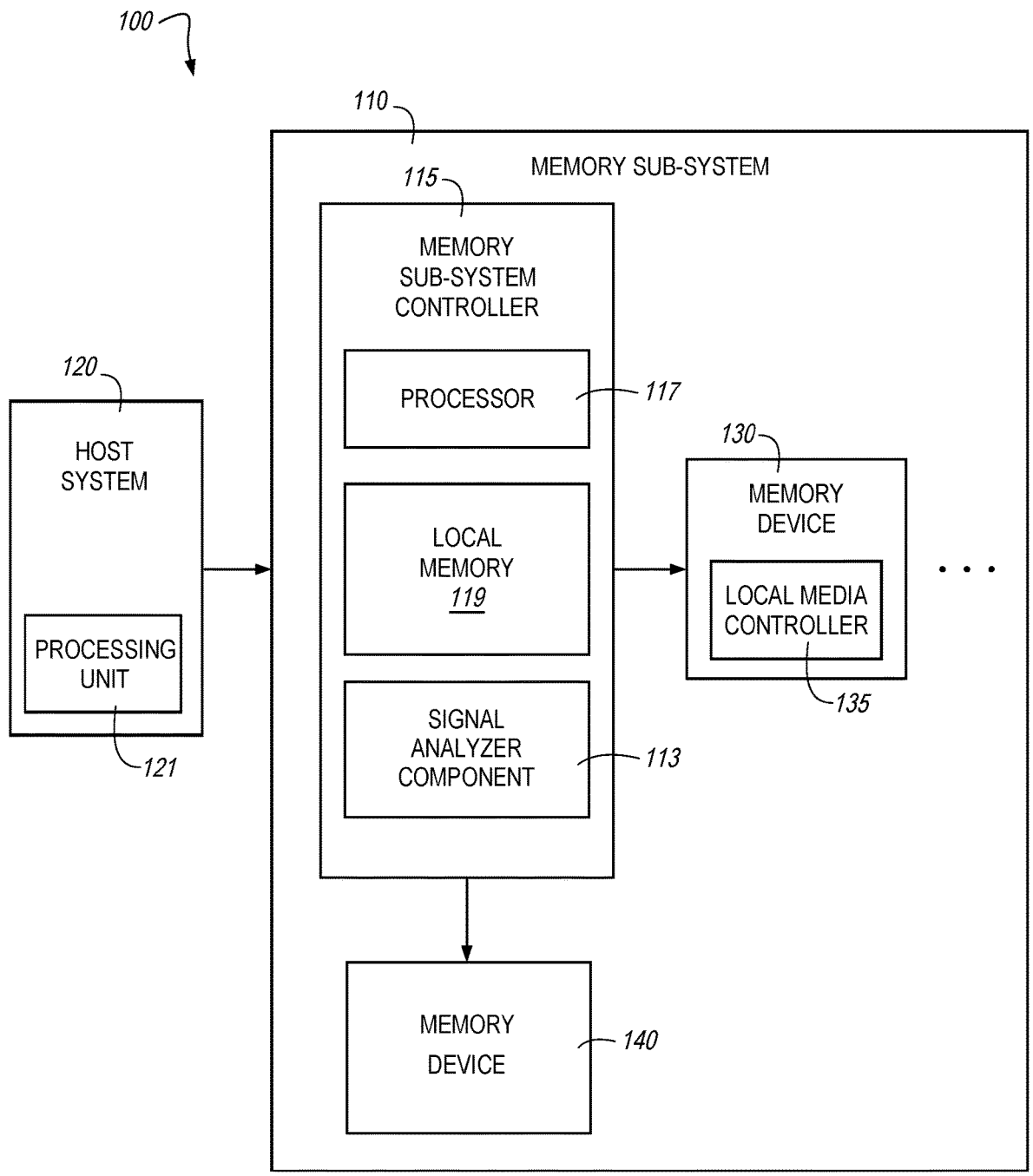
FIG. 1 illustrates an example computing system that includes a memory sub-system in accordance with some embodiments of the present disclosure.

Aspects of the present disclosure are directed to selectable signal, logging, and state extraction in a memory sub-system, in particular to memory sub-systems that include logic circuitry to facilitate selectable signal, logging, and state extraction. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a not-and or "negative-and" (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs), etc. For example, a SLC can store one bit of information and has two logic states, while a TLC can store multiple bits of information and has eight logic states.

Memory sub-systems and/or components of the memory sub-system(s) can, during the course of their lifetime, experience various types of failures and/or fault conditions. For example, a memory sub-system and/or the constituent components thereof, such as memory devices, controllers, caches, etc. can experience conditions in which at least some of the components of the memory sub-system cease to properly function and/or become entirely inoperable, thereby rendering the memory sub-system unable to operate as intended or, in a worst-case scenario, unable to operate at all (e.g., the memory sub-system or at least one component of the memory sub-system is non-responsive).

As used herein, the term "failure" or "fatal fault," generally refers to a condition in which at least one component of a memory sub-system has become inoperable, while the term "non-fatal fault" generally refers to a condition in which at least one component of a memory sub-system has experienced one or more faults and/or errors that have caused the component(s) and therefore the memory sub-system to operate with sub-standard performance. The term "fault condition" generally refers to a description of a cause or reason related to how a fault and/or error manifested itself into the component(s) of the memory sub-system that experience the fault and/or error, regardless if such fault and/or error is "fatal" or "non-fatal" and/or regardless is such fault and/or error is recoverable (in the case of a non-fatal fault) or non-recoverable (in the case of a fatal fault).

If the memory sub-system and/or the components of the memory sub-system experience such failures and/or fault conditions, it can be desirable to retrieve information, such as signal information, log information, state information, etc. stored by the components of the memory sub-system to analyze the signal information, log information, and/or state information to determine potential causes that led to the failures and/or fault conditions experienced by the components of the memory sub-system in order to triage the memory sub-system or the components thereof. As used herein, the term "triage" generally refers to operations that are performed to assess various conditions that led to the failures and/or fault conditions experienced by the memory sub-system. This can allow for the cause(s) of the failures and/or fault conditions experienced by the memory device to be narrowed in an effort to determine the best way to address such failures and/or fault conditions, which can expedite the resolution of problems associated with the memory sub-system that led to the failures and/or fault conditions. It may also be desirable to retrieve and analyze such information to attempt to remedy circumstances that led to the failures and/or fault conditions experienced by the components of the memory sub-system in an effort to diagnose and/or repair components of the memory sub-system. It may further be desirable to retrieve and analyze such information to attempt to gain an understanding of the circumstances that led to the failures and/or fault conditions experienced by the components of the memory sub-system in an effort to reduce the likelihood of components of a memory sub-system experiencing a fault condition and/or a failure under similar circumstances.

However, if the memory sub-system and/or the constituent components thereof have become inoperable due to the failures and/or fault conditions experienced by the components of the memory sub-system, retrieval of the log information may be difficult, costly, and/or time-consuming, which can exacerbate the difficulty of analyzing the signal information, the log information, the state information, etc. to diagnose, understand, and/or remedy the circumstances that led to the failures and/or fault conditions experienced by the components of the memory sub-system.

As an example, some approaches may require that the memory sub-system is decoupled from a host computing system and physically transported to a facility that utilizes specialized equipment (e.g., a protocol analyzer, etc.) to attempt to analyze and/or triage log information that may be stored within the memory sub-system (e.g., within a memory device of the memory sub-system). In many instances, the specialized equipment can be extremely costly, which, in turn, means that retrieval and/or analysis of the log information can be quite expensive. In addition, the retrieval and/or analysis of the log information in such approaches can be time-intensive, which can become a burden on the owner of the memory sub-system as they wait for the retrieval and/or analysis of the log information to be completed. Further, under some circumstances, analysis and/or triage of log information stored within the memory sub-system can, in some approaches, require that components of the memory sub-system are removed (e.g., de-soldered) from the memory sub-system, which can incur additional time and/or cost.

In addition, conventional approaches generally allow for only a relatively sparse quantity of data (e.g., log information) to be stored for later analysis and/or triage. For example, in order to reduce an amount of memory resources allocated for storage of log information, some approaches intentionally limit the amount of space in a memory device that is allocated for storage of the log information. In addition to, or in the alternative, some approaches rely on universal asynchronous receiver-transmitter (UART) debug logging, which is inherently limited in available log information in addition to being inflexible.

Aspects of the present disclosure address the above and other deficiencies through the use of special purpose circuitry (e.g., the "signal analyzer component" described herein, which may be referred to in the alternative as "control circuitry") that is added to the memory sub-system. As described in more detail herein, this circuitry can control monitoring and analysis of signals, logs, and/or state information associated with the memory sub-system and/or a memory device of the memory sub-system and can aid in the extraction of such information in the event that the memory sub-system has experienced a failure and/or fault condition that has caused the memory sub-system to become inoperable.

As described in more detail, herein, this circuitry can allow for monitoring and analysis of vastly larger quantities of signals (e.g., tens of thousands of signals) than previous approaches, such as those that rely on UART debug logging, among others, thereby increasing the amount of log and/or state information available for debugging and/or triage operations involving the memory sub-system. In addition, through the use of a dedicated memory resource that is not addressed within a user space of the memory sub-system, the special purpose circuitry described herein can persistently store greater amounts of information and/or differing types of information corresponding to the monitored and analyzed signals, logs, and/or state information than the approaches described above, and can facilitate storage of such information across multiple boot cycles of the memory sub-system to provide an improved view and understanding of conditions experienced by the memory sub-system in response to failures across multiple boot cycles in comparison to previous approaches. These and other advantages of the special purpose circuitry described herein can allow for improvements to the performance of a computing system in which the memory sub-system is deployed by offering insights into the behavior of the memory sub-system at a finer granularity than other approaches, which can improve debugging performance while reducing the costs associated with debug and triage operations performed in accordance with other approaches.

It is noted that aspects of the present disclosure are not limited to instances in which the memory sub-system has experienced a failure and/or fault condition that has caused the memory sub-system to become inoperable, however. For example, in some embodiments, the special purpose circuitry can also expedite resolution of non-fatal faults, such as thermal throttling and/or thermal gating performance, experienced by the memory sub-system during operation that can often times incur protracted delays in recovering information from the memory sub-system. As will be appreciated, thermal throttling or "thermal gating" operations can be performed to reduce a temperature of the memory sub-system. For example, during operation of the memory sub-system, conditions can occur in which components of the memory sub-system reach or exceed temperatures that are above a threshold temperature that allows for the memory sub-system to properly function. If such conditions occur, operations performed by the memory device can be throttled in an effort to reduce the temperature of the components of the memory sub-system to bring the memory sub-system below the threshold temperature. Performance of such operations can result in reduced performance of the memory sub-system thereby giving rise to a "non-fatal fault." Examples of non-fatal faults are not so limited; however, and another example of a non-fatal fault that can enjoy expedited resolution utilizing the special purpose circuitry described herein can be an unsafe shut down condition experienced by the memory sub-system in which an unexpected voltage loss and/or unexpected power loss occurs, and the memory sub-system is powered down without going through a normal power down sequence.

Advantageously, aspects of the disclosure described herein can allow for access, retrieval, and/or analysis of an expanded amount of signal information, log information, and/or state information associated with a memory sub-system. Further, in some embodiments, this information can be stored in a dedicated memory resource associated with the signal analyzer component and extracted therefrom in the absence of removal of the memory sub-system from a host computing system and/or physical transportation of the memory sub-system to a facility that utilizes specialized equipment to attempt to analyze and/or triage log information that may be stored within the memory sub-system. Stated alternatively, embodiments herein allow for the expanded signal, log, and/or state information stored by the memory sub-system to be accessed, retrieved, and/or analyzed "on site" (e.g., at a location in which the memory sub-system is deployed). This can reduce the costs and time associated with the approaches described above in addition to allowing insights into the behavior of the memory sub-system at a finer granularity than other approaches, which, as mentioned above, can improve debugging and/or triage of a memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a signal analyzer component 113. Although not shown in FIG. 1 so as to not obfuscate the drawings, the signal analyzer component 113 can include various circuitry (e.g., the memory resource 234, and/or the processing device 236 illustrated in connection with FIG. 2A and FIG. 2B, herein) to monitor, analyze, store, and/or allow for the extraction of signal information, log information, and/or state information generated during operation of the memory sub-system 110. The log information component 113 may be referred to herein in the alternative as "logic circuitry," "control circuitry," a "controller," or a "processor," given the context of the disclosure.

As described in more detail herein, in some embodiments, the signal analyzer component 113 can control monitoring and analysis of a plurality of signals within the memory sub-system 110. The signal analyzer component 113 can analyze the signals to determine relevant signals from the plurality of signals, selectively analyze and/or selectively sample (e.g., write information corresponding to the relevant signals to a memory resource) the relevant signals and write the information corresponding to the relevant signals to a memory resource associated with the signal analyzer component 113 such that the information corresponding to the relevant signals is stored in the memory resource associated with the signal analyzer component 113. As used herein, the term "relevant signals" generally refers to signals that are determined to have some utility in diagnosing a failure or fault condition that may be experienced by the memory sub-system 110 and/or signals that are determined to have some utility in triage operations involving the memory sub-system 110 in the event that memory sub-system 110 experiences such a failure or fault condition.

In general, any signal can be deemed as a "relevant signal;" however, due to inherent processing limitations associated with memory sub-systems, certain signals and/or the information corresponding thereto can be deemed more relevant than other such signals. In general, the relevancy of different types of signals can be understood in terms of a return on investment (ROI) for differing types of signals. For example, some non-limiting examples of signals that may be determined to be "relevant signals" include signals indicative of PCIE bus activity, error assertions, instruction queue bus signals, state machine signals, input/output signals associated with modules of the memory sub-system 110, signals associated with input/output buffers, signals associated with cache input/output operations, signals associated with timeouts, signals associated with timestamps, signals associated with programmable And-Or-Not array trigger starts and finishes, and/or signal associated with media accesses because such signals can have a larger ROI than some other types of signals. As an example, signals indicative of data and/or errors contained in data can be useful to understand in some embodiments, but may have a lower ROI that some of the signals discussed above and therefore may not always be considered "relevant signals.". In addition, signals that have been monitored or analyzed at greater than a threshold period of time (e.g., old or "stale" signals) may be considered as non-limiting examples of signals that are not "relevant signals."

In more general terms, "relevant signals" can include signals that can be determined at manufacture of a particular memory sub-system 110 that provide greater than a threshold ROI in terms of debugging value (e.g., how likely the information associated with such signals may be to assist in debugging and/or triage should a fault or failure involving the memory sub-system 110 occur) based on analysis of the memory sub-system 110 and/or the intended deployment conditions of such a memory sub-system 110. For example, while any and/or all signals present during operation of the memory sub-system 110 can be analyzed in accordance with the disclosure, control signals, state machine signals, signals corresponding to addresses of the memory sub-system 110, bit flip errors in data, etc. may have a greater ROI than signals associated with data bus traffic. Accordingly, control signals, state machine signals, signals corresponding to addresses of the memory sub-system 110, signals corresponding to bit flip errors in data may therefore be determined to be "relevant" because such signals can generally exhibit greater than a threshold ROI for purposes of debugging and/or triage of a memory sub-system 110 that has experienced a fault condition, failure, or the like, as described herein.

Further, in some embodiments, signals that are associated with components (e.g., chips, circuit components, etc.) that are directly soldered to a circuit board (e.g., a PCB or other substrate) of the memory sub-system 110 can be treated as "relevant signals" within the scope of the disclosure at least because the behavior of such signals is traditionally obfuscated to debugging and/or triage operations due to limited visibility afforded thereto in the absence of expensive signal analysis techniques that, for example, require a signal analyzer as discussed above.

In some embodiments, the information corresponding to the relevant signals can be stored as log information and/or the signal analyzer circuit 113 can generate log information and store the log information based on other information associated with the memory sub-system 110 that is monitored by the signal analyzer component 113. In addition to, or in the alternative, the signal analyzer component 113 can store state information associated with the memory sub-system 110 in the memory resource of the signal analyzer component 113 and/or in the memory device 130, as described in more detail below. As mentioned above, the information (e.g., the signal information, log information, and/or state information) can be stored by the memory resource of the signal analyzer component 113 and/or in the memory device 130 in a persistent manner such that is accessible across multiple boot cycles of the memory sub-system 110 and/or across multiple boot cycles of the constituent components (e.g., the memory device 130/140, etc.) thereof.

In some embodiments, the signal analyzer component 113 can include special purpose circuitry in the form of an ASIC, FPGA, state machine, and/or other logic circuitry that can allow the signal analyzer component 113 to orchestrate and/or perform operations described herein involving the memory device 130 and/or the memory device 140.

In some embodiments, the memory sub-system controller 115 includes at least a portion of the signal analyzer component 113. For example, the memory sub-system controller 115 can include a processor 117 (processing device) configured to execute instructions stored in local memory 119 for performing the operations described herein. In some embodiments, the signal analyzer component 113 is part of the host system 120, an application, or an operating system. In yet other embodiments, the signal analyzer component 113 is resident on the memory device 130. As used herein, the term "resident on" refers to something that is physically located on a particular component. For example, the signal analyzer component 113 being "resident on" the memory device 130 refers to a condition in which the hardware circuitry that comprises the signal analyzer component 113 is physically located on the memory device 130. The term "resident on" can be used interchangeably with other terms such as "deployed on" or "located on," herein.

In some embodiments, the memory sub-system 110, and hence the signal analyzer component 113, can be resident on a mobile computing device such as a smartphone, laptop, phablet, Internet-of-Things device, autonomous vehicle, or the like. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

Figure 2A:
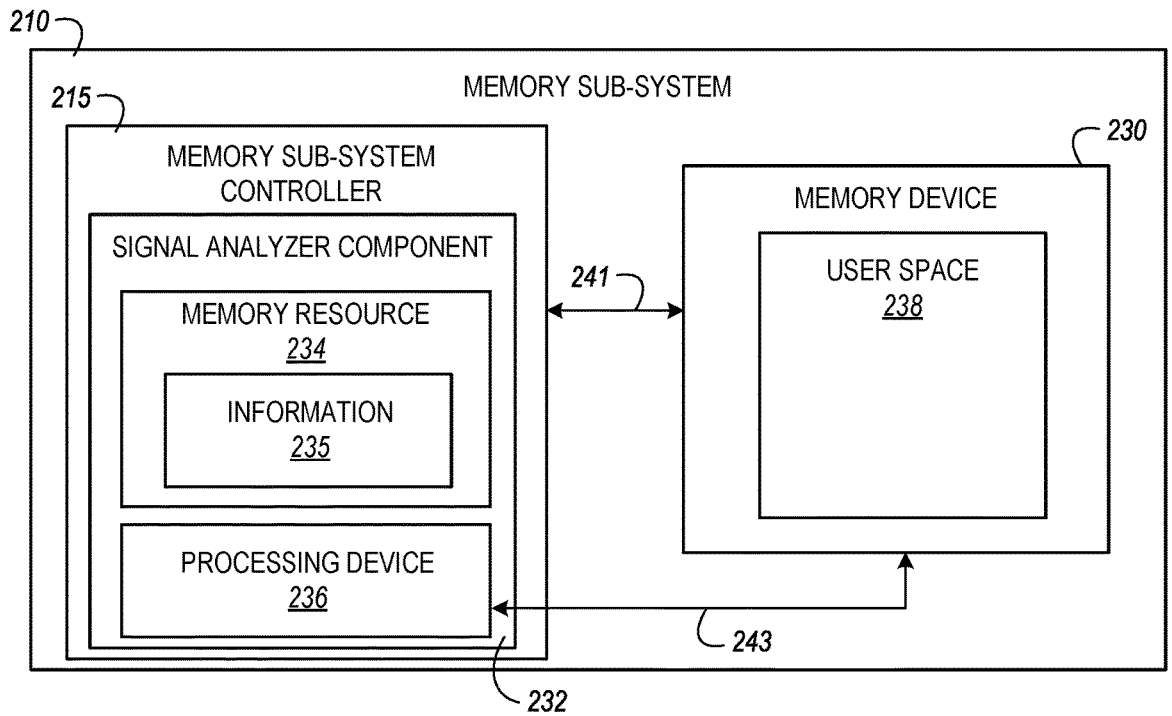
FIG. 2A illustrates an example memory sub-system in accordance with some embodiments of the present disclosure.
Figure 2B:
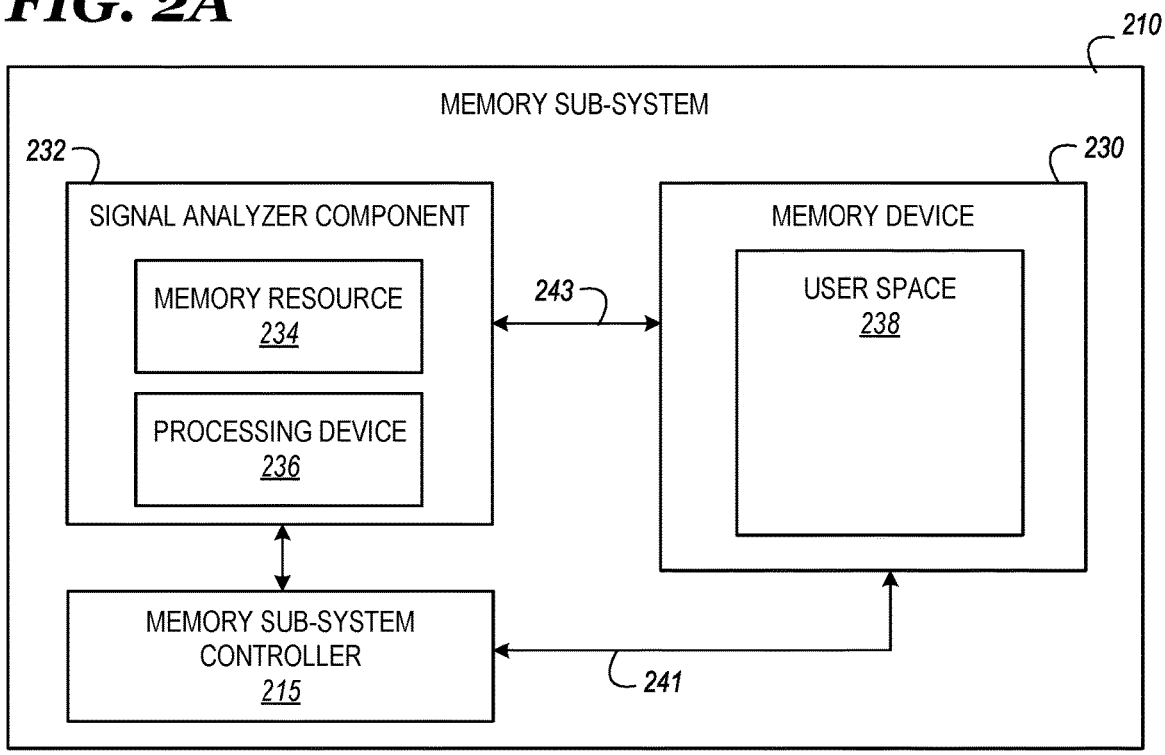
FIG. 2B illustrates another example memory sub-system in accordance with some embodiments of the present disclosure.

FIGS. 2A-2D illustrate various example memory sub-systems 210 in accordance with some embodiments of the present disclosure. FIGS. 2A-2B generally illustrate embodiments in which information 235 is stored within a memory resource 234 that is resident on a signal analyzer component 232, while FIGS. 2C-2D generally illustrate embodiments in which information 235 is stored within a memory partition 237 of a memory device 230.

FIG. 2A illustrates an example memory sub-system 210 in accordance with some embodiments of the present disclosure. The memory sub-system 210 can be analogous to the memory sub-system 110 illustrated in FIG. 1, herein. As shown in FIG. 2A, the memory sub-system 210 includes a memory sub-system controller 215, which can be analogous to the memory sub-system controller 115 illustrated in FIG. 1, that is coupled to a memory device 230, which can be analogous to the memory device 130 illustrated in FIG. 1. The memory sub-system controller 215 includes a signal analyzer component 232. In some embodiments, the signal analyzer component 232 can be analogous to the signal analyzer component 113 illustrated in FIG. 1.

In FIG. 2A, the signal analyzer component 232 includes a memory resource 234 and a processing device 236. The signal analyzer component 232 can, in general, comprise circuitry and/or other electrical components that operate to allow the signal analyzer component 232 to control performance of the task and/or functions described herein. Accordingly, the signal analyzer component 232 can be referred to herein in the alternative as "control circuitry" or "circuitry" for brevity. The signal analyzer component 232 and/or the processing device 236 of the signal analyzer component can be coupled to the memory device 230 via a dedicated channel 243 that is provided to transfer information 235 corresponding to signals, log information, state information, etc. associated with the memory device 230. That is, a dedicated channel 243 that is separate from a channel 241 that is used to couple the memory sub-system controller 215 to the memory device 230 can be utilized for the specific purpose of transferring information 235 corresponding to signals, log information, state information, etc. from the memory device 230 to the signal analyzer component 232 and/or the processing device 236. Embodiments are not so limited, however, and in some embodiments, the signal analyzer component 232 and/or the processing device 236 of the signal analyzer component can be coupled to the memory device 230 via a channel that is provided to transfer information 235 corresponding to signals, log information, state information, etc. in addition to other memory commands (e.g., read/write/erase commands, etc.).

The memory resource 234 can be a persistent memory resource. That is, the memory resource 234 can be configured to retain data written thereto in the event that the memory sub-system 210 loses power, is re-booted, or otherwise power cycled. The processing device 236 can be any kind of hardware processing device, for example, a reduced instruction set computing architecture device (e.g., a RISC device, such as a RISC-V device), ASIC, FPGA, logic circuit, or other suitable hardware processor that includes hardware circuitry to execute instructions to perform various tasks.

In some embodiments, the memory resource 234 can be a dedicated memory resource that is configured to store information 235. The information 235 can correspond to signals, logs, and/or state information associated with the memory sub-system 210, as opposed to user data or other data stored by, for example, the memory device 230. The information 235 (e.g., information corresponding to the signals, log information, and/or state information) can include signals indicative of PCIE bus activity, error assertions, instruction queue bus signals, state machine signals, input/output signals associated with modules of the memory sub-system 210, signals associated with input/output buffers, signals associated with cache input/output operations, signals associated with timeouts, signals associated with timestamps, signals associated with programmable And-Or-Not array trigger starts and finishes, and/or signal associated with media accesses, among other information that corresponds to various signals, as discussed above. Advantageously, some embodiments can allow for the state information to be encoded (e.g., within the signal analyzer component 232 and/or the memory device 230) such that a quantity of physical communication paths (e.g., wires, traces, etc.) that are generally present in contemporary memory devices are reduced, thereby reducing the footprint and/or power consumption of the memory sub-system 210 in comparison to such approaches.

In some embodiments, the information 235 (e.g., information corresponding to the signals, log information, and/or state information) can include Self-Monitoring, Analysis and Reporting Technology (SMART) log information that is used to monitor and/or record health characteristics of the memory device 230 over time. In general, SMART is a monitoring system utilized by some memory devices to detect and report various indicators of drive reliability with the intent of anticipating imminent hardware failures. SMART can include the use of counters to track memory accesses to determine how many times and/or how frequently the memory device is accessed.

Embodiments are not limited to writing and/or storing of SMART log information, however, and other information 235 that corresponds to health characteristics of the memory device 230 and/or a functional state of the memory device 230 can be written to the memory resource 234 during operation of the memory sub-system 210 and/or the memory device 230. For example, a quantity of program-erase cycles (PECs) experienced by the memory device 230 can be indicative of the health of the memory device 230 and, accordingly, information corresponding to a quantity of PECs experienced by the memory device can be included in the information 235 written to the memory resource 234. Other non-limiting examples of information that can be indicative of the health of the memory device 230 that can be included in the information 225 can include cross-temperature characteristics of the memory device 230, wear leveling characteristics of the memory device 230, and/or determined voltage drift characteristics of the memory device 230, among others.

In some embodiments, the information 235 can include functional state information corresponding to the memory device 230. Such information can include error log information that can include a record of all errors experienced (either hardware errors, software errors, or both) by the memory device 230, persistent event log information, encoded operational mode information, relative time information (e.g., of events occurring within the memory sub-system), information corresponding to state machine monitoring, controller information, status bit information, and/or operational failure information 235 associated with the memory device 230, among others.

In some embodiments, the memory device 230 coupled to the memory sub-system controller 215 is a non-volatile memory device and, accordingly, can include multiple blocks of non-volatile memory cells (e.g., flash memory cells). These blocks of non-volatile memory cells can form a user space 238 of the memory device 230. In general, the user space 238 of the memory device 230 is utilized for storing user data, application data, and other data that is not reserved as kernel space for the memory device 230.

FIG. 2B illustrates another example memory sub-system 210 in accordance with some embodiments of the present disclosure. The memory sub-system 210 can be analogous to the memory sub-system 110/210 illustrated in FIG. 1 and FIG. 2A, herein. As shown in FIG. 2B, the memory sub-system 210 includes a memory sub-system controller 215, which can be analogous to the memory sub-system controller 115/215 illustrated in FIG. 1 and FIG. 2A, that is coupled to a memory device 230, which can be analogous to the memory device 130/230 illustrated in FIG. 1 and FIG. 2A. The memory sub-system controller 215 includes a signal analyzer component 232. In some embodiments, the signal analyzer component 232 can be analogous to the signal analyzer component 113 illustrated in FIG. 1 or the signal analyzer component 232 illustrated in FIG. 2A, herein.

In contrast to the embodiment illustrated in FIG. 2A, in FIG. 2B, the signal analyzer component 232 is resident on the memory sub-system 210 but is physically distinct from the memory sub-system controller 215. That is, as shown in FIG. 2B, the signal analyzer component 232 is not resident on the memory sub-system controller 215. However, the signal analyzer component 232 operates in the same manner as discussed throughout the specification and as discussed in connection with FIG. 1, FIG. 2A, etc. Further, although not explicitly shown in FIG. 2B so as to not obfuscate the layout of the drawings, the memory resource 234 can be configured to store information, such as the information 235 illustrated in FIG. 2A.

Figure 2C:
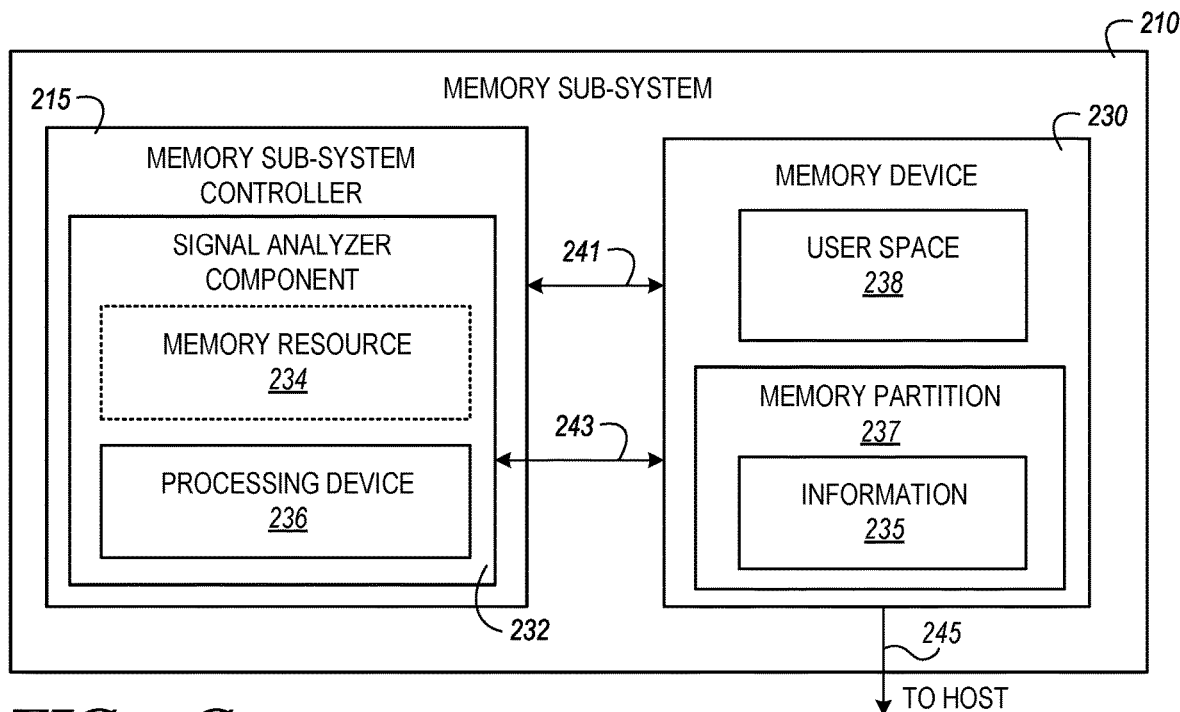
FIG. 2C illustrates another example memory sub-system in accordance with some embodiments of the present disclosure.

FIG. 2C illustrates another example memory sub-system 210 in accordance with some embodiments of the present disclosure. The memory sub-system 210 can be analogous to the memory sub-system 110/210 illustrated in FIG. 1, FIG. 2A, and FIG. 2B, herein. As shown in FIG. 2C, the memory sub-system 210 includes a memory sub-system controller 215, which can be analogous to the memory sub-system controller 115/215 illustrated in FIG. 1, FIG. 2A, and FIG. 2B, that is coupled to a memory device 230, which can be analogous to the memory device 130/230 illustrated in FIG. 1, FIG. 2A, and FIG. 2B. The memory sub-system controller 215 includes a signal analyzer component 232. In some embodiments, the signal analyzer component 232 can be analogous to the signal analyzer component 113 illustrated in FIG. 1 or the signal analyzer component 232 illustrated in FIG. 2A and FIG. 2B, herein.

As shown in FIG. 2C, the signal analyzer component 232 includes a memory resource 234 (which can be analogous to the memory resource 234 illustrated in FIG. 2A and FIG. 2B, herein) and a processing device 236 (which can be analogous to the processing device 236 illustrated in FIG. 2A and FIG. 2B, herein). In contrast to the embodiments illustrated in FIG. 2A and FIG. 2B, the memory resource 234 of the signal analyzer component 232 is shown within a dashed box to indicate that the memory resource 234 of the signal analyzer component 232 is optional in the embodiment of FIG. 2C.

As mentioned above, in the embodiment illustrated in FIG. 2C, the information 235 is written to and stored within a memory partition 237 of the memory device 230. The memory partition 237 generally includes memory locations (e.g., memory blocks, etc.) that have memory addresses (e.g., physical memory addresses and/or logical memory addresses) that are outside of (e.g., not within) a user space 238 of the memory device. That is, a set of memory addresses associated with the user space 238 and a set of memory addresses associated with the memory partition 237 are mutually exclusive or non-overlapping.

Figure 2D:
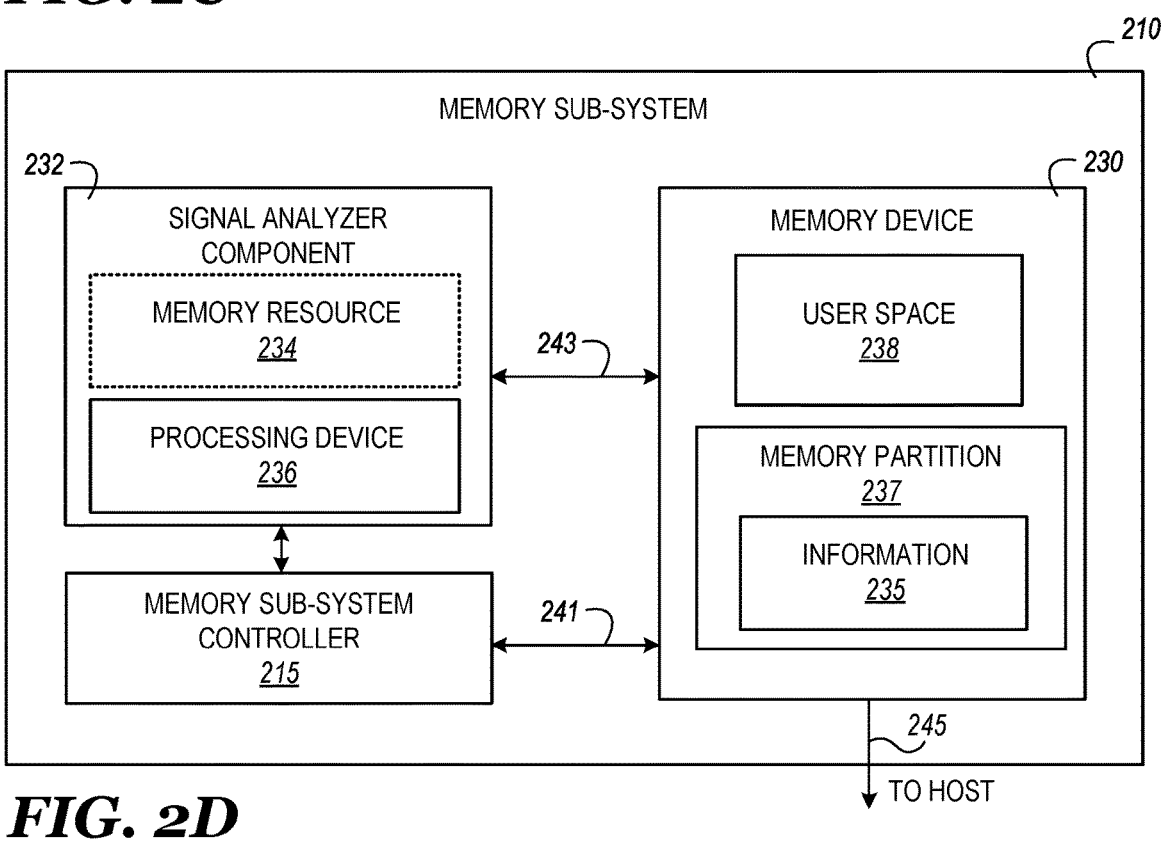
FIG. 2D illustrates another example memory sub-system in accordance with some embodiments of the present disclosure.

FIG. 2D illustrates another example memory sub-system 210 in accordance with some embodiments of the present disclosure. The memory sub-system 210 can be analogous to the memory sub-system 110/210 illustrated in FIG. 1, FIG. 2A, FIG. 2B, and FIG. 2C, herein. As shown in FIG. 2D, the memory sub-system 210 includes a memory sub-system controller 215, which can be analogous to the memory sub-system controller 115/215 illustrated in FIG. 1, FIG. 2A, FIG. 2B, and FIG. 2C, that is coupled to a memory device 230, which can be analogous to the memory device 130/230 illustrated in FIG. 1, FIG. 2A, FIG. 2B, and FIG. 2C. The memory sub-system 210 further includes a signal analyzer component 232. In some embodiments, the signal analyzer component 232 can be analogous to the signal analyzer component 113 illustrated in FIG. 1 or the signal analyzer component 232 illustrated in FIG. 2A, FIG. 2B, and FIG. 2C, herein.

As shown in FIG. 2D, the signal analyzer component 232 includes a memory resource 234 (which can be analogous to the memory resource 234 illustrated in FIG. 2A, FIG. 2B, and/or FIG. 2C, herein) and a processing device 236 (which can be analogous to the processing device 236 illustrated in FIG. 2A, FIG. 2B, and/or FIG. 2C, herein). In contrast to the embodiments illustrated in FIG. 2A and FIG. 2B, and similar to the embodiment illustrated in FIG. 2C, the memory resource 234 of the signal analyzer component 232 is shown within a dashed box to indicate that the memory resource 234 of the signal analyzer component 232 is optional in the embodiment of FIG. 2D.

Similar to the embodiment of FIG. 2C, in the embodiment illustrated in FIG. 2D, the information 235 is written to and stored within a memory partition 237 of the memory device 230. The memory partition 237 generally includes memory locations (e.g., memory blocks, etc.) that have memory addresses that are outside of (e.g., not within) a user space 238 of the memory device. That is, a set of memory addresses associated with the user space 238 and a set of memory addresses associated with the memory partition 237 are mutually exclusive or non-overlapping.

In contrast to the embodiment illustrated in FIG. 2C, in FIG. 2D, the signal analyzer component 232 is resident on the memory sub-system 210 but is physically distinct from the memory sub-system controller 215. That is, as shown in FIG. 2D, the signal analyzer component 232 is not resident on the memory sub-system controller 215. However, the signal analyzer component 232 operates in the same manner as discussed throughout the specification and as discussed in connection with FIG. 1, FIG. 2A, FIG. 2B, and FIG. 2C, etc.

In a non-limiting example, an apparatus (e.g., the memory system 210 illustrated in FIGS. 2A-2D) can include a memory device 230 that is resident on a memory sub-system 210. A processing device 236 is resident on the memory sub-system and is coupled to the memory device 230. The processing device 236 can analyze a plurality of signals indicative of state information of the memory device 230 and determine relevant signals among the plurality of signals. The relevant signals can comprise a subset of signals among the plurality of signals (e.g., a total quantity of relevant signals is less than a total quantity of the plurality of signals). In some embodiments, the processing device 236 is configured to determine the relevant signals based by determining that the relevant signals are indicative of performance of the memory sub-system 210 and/or fault conditions experienceable by the memory sub-system 210. By determining the relevant signals, the processing device 236 effectively selectively determines what types of information 235 are analyzed and/or sampled.

In some embodiments, the processing device 236 can encrypt the information 235 corresponding to the relevant signals among the plurality of signals. The encryption can be provided by any standard encryption methodologies known or to be discovered in the future. In some embodiments, the encryption corresponds to an encryption key that is paired with a decryption key that allows for the encrypted information 235 to be decrypted. The encryption and/or decryption keys can be unique to the memory sub-system 210 and/or to the memory device 230. That is, each memory sub-system 210 and/or memory device 230 that is manufactured and provided to a user can have a unique set of encryption/decryption keys associated therewith. In some embodiments, the information 235 is encrypted prior to being written by the processing device 236 to a memory partition 237 of the memory device 230.

Continuing with this non-limiting example, the processing device 236 can write information 235 corresponding to the relevant signals to a memory partition 237 of the memory device 230. At some point after the information 235 has been written to the memory partition 237 of the memory device 230, the processing device 236 can extract the information 235 corresponding to the relevant signals among the plurality of signals from the memory partition 237. The information 235 can include timestamps corresponding to when the relevant signals were observed, sampled, and/or written to the memory partition 237 (or memory device 234).

For example, the processing device 236 can extract the information 235 corresponding to the relevant signals among the plurality of signals from the memory partition 237 in response to determining that a fault (or fault condition) involving the memory sub-system 210 has occurred. The fault condition can refer to an event experienced by the memory sub-system 210 and/or the memory device 230 in which the memory sub-system 210 and/or the memory device 230 has experienced a failure such that the memory sub-system 210 and/or the memory device 230 is inoperable. For example, the fault condition can be indicative of a condition in which the memory device has experienced a failure that renders the memory sub-system 210 and/or the memory device 230 inoperable. Embodiments are not so limited, however, and in some embodiments, the fault condition can be indicative of an event experienced by the memory sub-system 210 and/or the memory device 230 in which the memory sub-system 210 and/or the memory device 230 experiences a non-fatal fault condition, as described above. Examples of non-fatal fault conditions include recoverable errors experienced by the memory sub-system 210 and/or the memory device 230 (e.g., silent and/or undetected error conditions) that generally do not have a major impact on the functionality of the memory sub-system 210 and/or the memory device 230. That is, non-fatal faults can include conditions experienced by the memory sub-system 210 and/or the memory device 230 in which the memory sub-system 210 and/or the memory device 230 remains operable such that specifications associated with the memory sub-system 210 and/or the memory device 230 are not violated. In some embodiments, the fault condition can be determined by a user of the memory sub-system 210 and/or the memory device 230 or by the memory sub-system 210 and/or the memory device 230 itself in the absence of user control.

As described above, the memory partition 237 comprises memory locations that are not within a set of memory locations that comprise a user space 238 of the memory device 230. In such embodiments, the processing device 236 is configured to write the relevant signals to one or more logs in the memory locations of the memory partition 237 (e.g., to memory locations that are not within the user space 238 of the memory device 230).

In some embodiments, the memory device 230 (and hence, the memory partition 237) is a persistent memory device 230 configured to retain the sampled relevant signals subsequent to one or more fault confirmation reboot cycles experienced by the memory sub-system 210. That is, in contrast to approaches in which state information is lost when the memory sub-system 210 is rebooted (e.g., power cycled) or, at minimum in which state information is lost when the memory sub-system 210 is rebooted multiple times subsequent writing information (e.g., state information to a memory resource), embodiments herein allow for the information 235 corresponding to the relevant signals that is written to the memory partition 237 to be maintained after multiple reboots and/or power cycles. This can allow for the information 235 corresponding to the relevant signals to be retained for a longer period of time than previous approaches, therefore improving the ability to analyze the information 235 corresponding to the relevant signals to debug and/or triage the memory sub-system 210. This can be especially useful in scenarios in which a user of the memory sub-system 210 repeatedly power cycles the memory sub-system 210 in an effort to remedy a failure or fault condition experienced by the memory sub-system 210.

Continuing with this non-limiting example, the processing device 236 can comprise or otherwise be part of a signal analyzer component 232. As shown in the various embodiments of FIGS. 2A-2D, the signal analyzer component 232 is resident on a controller (e.g., the memory sub-system controller 215 and/or the media controller 125 illustrated in FIG. 1) that is resident on the memory sub-system 210. As discussed above, embodiments are not so limited, however, and in some embodiments, the signal analyzer component 232 is physically distinct from a controller (e.g., the memory sub-system controller 215 and/or the media controller 125 illustrated in FIG. 1) that is resident on the memory sub-system 210.

In some embodiments, the memory sub-system 210 is coupled to a host system (e.g., the host system 120 illustrated in FIG. 1). In such embodiments, the processing device 236 can be configured to extract the information 235 corresponding to the relevant signals among the plurality of signals from the memory partition 237 to the host system. For example, the processing device 236 can cause the information 235 to be transferred to the host system for analysis as part of an operation to debug or otherwise triage the memory sub-system 210 when the memory sub-system 210 has experienced a fault condition. The information 235 can be extracted to a binary file or other suitable file type that allows for the information 235 to be analyzed. In some embodiments, the information 235 can be extracted from the memory sub-system 210 to the host system using a universal serial bus (USB) interface, serial advanced technology attachment (SATA) interface, or other suitable data transfer interface.

The apparatus can include a dedicated channel 243 coupling the processing device 236 to the memory device 230 and/or or the memory sub-system 210. In some embodiments, the dedicated channel 243 is configured to carry the plurality of signals indicative of state information between the processing device 236 and the memory device 230 and/or the memory sub-system 210. This can alleviate signal traffic bottlenecks across a channel 241 that is generally provided between the memory sub-system controller 215 and the memory device 230 to pass commands and/or data between the memory device 230 and the memory sub-system controller 215.

Data transfer rates across the dedicated channel 243 can be selectively set prior to initiation of the memory sub-system 210, during arbitration of the debugging channel (e.g., the debugging channel 245), and/or during operation of the memory sub-system 210. For example, a "lossy" data transfer rate can be set for data transfers across the dedicated channel 243 to increase overall memory sub-system 210 bandwidth, while a "lossless" data transfer rate can be set for data transfers across the dedicated channel 243 to increase overall transfer speed of the information 235. Similarly, in embodiments in which the information 235 is transferred via an existing channel of the memory sub-system 210, data transfer rates across the existing channel can be selectively set prior to initiation of the memory sub-system 210 and/or during operation (e.g., during runtime) of the memory sub-system 210 for similar reasons.

As used herein, the term "lossy" generally refers to a condition in which data traffic, such as data packets, etc., may be lost or "dropped" in order to prioritize functional data (e.g., command and/or data traffic) associated with a memory sub-system over data that corresponds to the relevant signals (e.g., data that is used for debugging and/or triage) described herein. The term "lossless" generally refers to a condition in which the relevant signal data is prioritized, e.g., over functional data, in order to capture a maximum quantity of signals that can be used for debugging and/or triage of the memory sub-system 210. Although "lossy" and "lossless" operational modes may be selected prior to and/or during runtime of the memory sub-system 210, a "lossy" mode may be utilized more frequently during runtime of the memory sub-system 210 while a "lossless" mode may be beneficial during initiation of the memory sub-system 210 when functional traffic may be minimal or reduced in comparison to runtime of the memory sub-system 210.

In some embodiments, the apparatus includes a dedicated debugging channel 245 couplable between the memory device 230 and a host computing device (e.g., the host system 120 illustrated in FIG. 1, herein) external to the memory sub-system 210. Although the dedicated debugging channel 245 illustrated in FIG. 2C and FIG. 2D is shown as being coupled to the memory device 230, and not shown in FIG. 2A and FIG. 2B so as to not obfuscate the drawing layout, a similar dedicated debugging channel can be coupled to the memory resource 234 shown in, for example, FIG. 2A and FIG. 2B and/or the optional memory resource 234 illustrated in FIG. 2C and FIG. 2D.

The dedicated debugging channel 245 can be configured to carry the extracted information corresponding to the relevant signals from the memory partition 237 of the memory device 230 to the host computing device. The dedicated debugging channel 245 can enable the information 235 to be retrieved by a host from the memory device 230 even if the memory device 230, the memory sub-system controller 215, and/or the signal analyzer component 232 have become unusable or otherwise non-responsive. The dedicated debugging channel 245 can be a Joint Test Action Group (JTAG) compliant channel (e.g., a port or other interface), although embodiments are not so limited provided the debugging channel 245 can interface with the host to allow for the information 235 to be extracted from the memory device 230 in the event that memory device 230, the memory sub-system controller 215, the signal analyzer component 232, and/or the memory sub-system 210 have become unusable.

In some embodiments, the processing device 236 can determine that the information 235 has been stored in the memory partition 237 (or in the memory resource 234 in the embodiments of FIG. 2A and FIG. 2B) for greater than a threshold period of time. In such scenarios, the processing device 236 can control writing of new information to the memory partition 237 and/or the memory resource 234 such that the information 235 is overwritten. By overwriting the information 235 with new information when the information 235 has been stored by the memory partition 237 and/or the memory resource 234 for greater than the threshold period of time, an amount of physical memory resources required to store the information 235 can be reduced. Further, by overwriting the information 235 periodically, it is possible to ensure that the information 235 is as current as possible in the event of a fault condition and/or failure of the memory device 230 and/or the memory sub-system 210.

In other embodiments, the processing device 235 can determine that a quantity of data associated with previously written information 235 that has been written to the memory partition 237 and/or the memory resource 234 meets or exceeds a quantity of storage locations available to the memory partition 237 or the memory resource 234. In such embodiments, the processing device 236 can control writing of the information 235 to the other of the memory partition 237 or the memory resource 234 in response to the determination such that the previously written information 235 is overwritten.

By overwriting information when the previously written information 235 corresponding thereto meets or exceeds a quantity of storage locations available to the memory partition 237 and/or the memory resource 234, an amount of physical memory resources required to store the information 235 can be reduced. Further, by overwriting the information 235 when an amount of previously written data meets or exceeds a quantity of storage locations available to the memory partition 237 and/or the memory resource 234, it is possible to ensure that the information 235 is as current as possible in the event of a fault condition and/or failure of the memory device 230 while minimizing an amount of storage resources required by the memory resource 224.

In some embodiments, the processing device 236 can extract relevant information from the information 236 such that a quantity of bits associated with the information 235 is reduced prior to controlling writing of the information 235 to the memory partition 237 and/or the memory resource 234. By processing the information 235 to reduce the quantity of bits associated with the information 235, it may be possible to minimize an amount of physical memory resources required to store the information 235 while maintaining current and accurate information in the event that the memory device 230 and/or the memory sub-system 210 experiences a fault condition and/or a failure.

In another non-limiting example, non-transitory computer-readable storage medium (e.g., the machine-readable medium 424 illustrated in FIG. 4, herein) includes instructions (e.g., the instructions 426 illustrated in FIG. 4, herein) that, when executed by a processing device 236 (and/or the signal analyzer component 113/232 illustrated in FIG. 1 and FIGS. 2A-2D, or the processing device 402 illustrated in FIG. 4), cause the processing device 236 to monitor a plurality of signals indicative of state information of a memory device 230 resident on a memory sub-system 210. The instructions can be further executed by the processing device 236 to analyze the plurality of signals and determine, based on the analysis of the plurality of signals, relevant signals among the plurality of signals. As discussed above, the relevant signals can comprise a subset of signals among the plurality of signals.

The processing device 236 can write information 235 corresponding to the relevant signals to a persistent memory resource associated with a signal analyzer circuit 236. The persistent memory resource can be the memory resource 234 and/or the memory partition 237. As described above, the processing device 236 can encrypt the information 235 corresponding to the relevant signals. In some embodiments, the processing device 236 can execute the instructions to determine the relevant signals based by determining that the relevant signals are indicative of performance of the memory sub-system 210 and/or the memory device 230, fault conditions experienceable by the memory sub-system 210 and/the memory device 230, or any combination thereof.

Continuing with this non-limiting example, the processing device 236 can determine that a fault involving the memory sub-system 210 has occurred. As described above, the fault can be a fatal fault in which the memory sub-system 210 becomes unresponsive when rebooted. Embodiments are not so limited, however, and as described above, the fault can be a non-fatal, such as a silent fault or not immediately be detected by the memory sub-system 210 and/or may not immediately cause the memory sub-system 210 to become inoperable. In response to the determination that the fault occurred, the encrypted information 235 corresponding to the relevant signals among the plurality of signals can be extracted from the persistent memory resource.

The processing device 236 can further execute instructions to retain the relevant signals within the persistent memory resource subsequent to one or more fault confirmation reboot cycles experienced by the memory sub-system 210 and/or one or more fault confirmation reboot cycles experienced by the memory device 230. As described above, this can allow for the relevant signals to be analyzed subsequent to extraction regardless of whether the memory sub-system 210 and/or the memory device 230 has been rebooted multiple times subsequent to determining that the fault involving the memory sub-system 210 and/or the memory device 230 has occurred.

In some embodiments, the processing device 236 can execute the instructions to transfer the extracted encrypted information corresponding to the relevant signals from the persistent memory resource to the host computing device. For example, the encrypted information 235 can be extracted from the persistent memory resource to a host computing device (e.g., the host system 120 illustrated n FIG. 1, herein) for further analysis, such as debugging analysis, triage analysis, etc. Embodiments are not so limited, however, and the encrypted information 235 can be extracted to circuitry that is external to the memory sub-system 210 that is not a host computing system. As discussed above, the computing system (e.g., the host computing system or other circuitry) can perform operations to decrypt the encrypted information 235 as part of the further analysis, such as debugging analysis, triage analysis, etc.

Embodiments are not so limited, however, and in some embodiments, the processing device 236 can receive decryption keys to decrypt the encrypted information 235 prior to transferring the information to the host or other circuitry external to the memory sub-system 210. In some embodiments, the encryption and/or decryption (e.g., the respective encryption keys and/or decryption keys) can be unique to the memory sub-system 210 and/or the memory device 210. In such embodiments, the encryption keys and/or decryption keys can be generated during or subsequent to manufacture of the memory sub-system 210 and/or the memory device 230. This can allow for the memory sub-system 210 and/or the memory device 230 to enjoy a unique set of encryption/decryption keys to provide authentication that are not replicated for other memory sub-systems or memory devices, thereby increasing the security of such encryption and decryption keys.

In order to provide additional security, in some embodiments, the memory sub-system 210 can be configured to enter a locked state in which the information 235 cannot be retrieved from the memory sub-system 210 in response to receipt of an incorrect decryption key. The locked state can be entered for a set period of time (e.g., 20 minutes, one hour, etc.) or the locked state can be maintained until a special decryption key is provided to remove the locked state condition from the memory sub-system 210.

Figure 3:
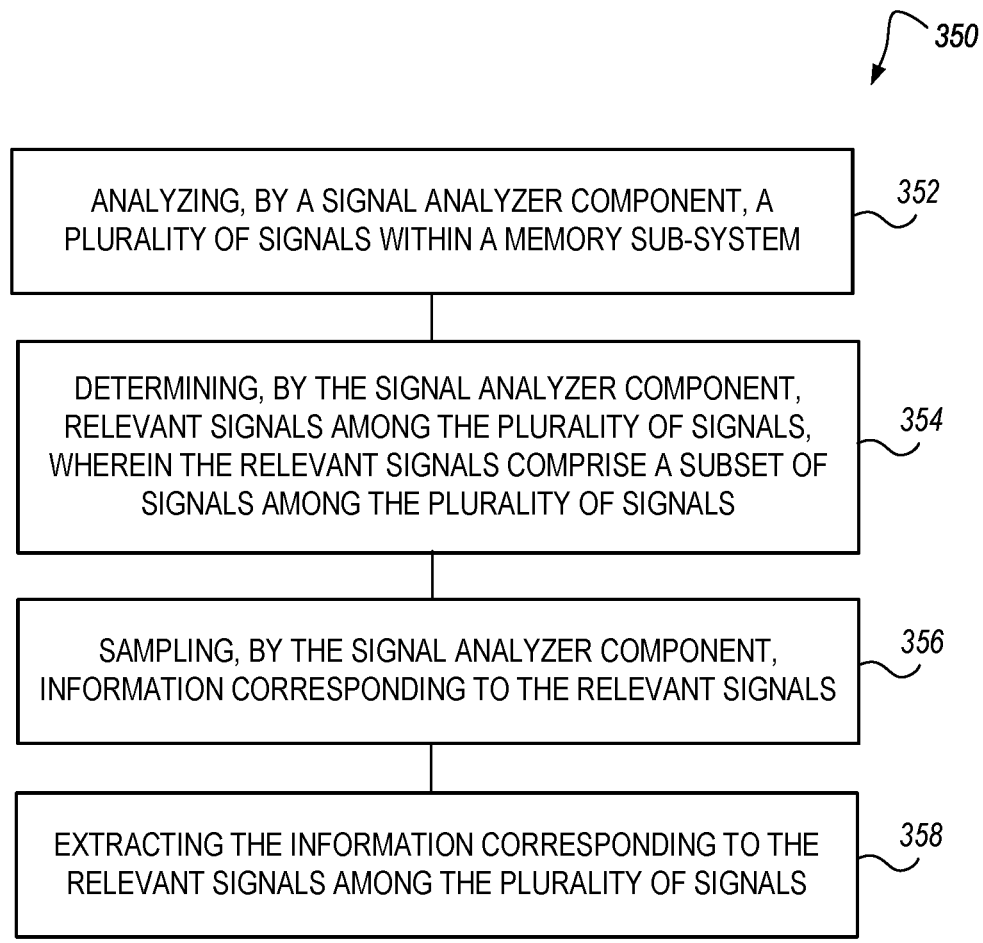
FIG. 3 is a flow diagram corresponding to a method for selectable signal, logging, and state extraction in accordance with some embodiments of the present disclosure.

FIG. 3 is a flow diagram corresponding to a method 350 for selectable signal, logging, and state extraction in accordance with some embodiments of the present disclosure. The method 350 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 350 is performed by the signal analyzer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 352, the method 350 includes analyzing, by a signal analyzer component, a plurality of signals within a memory sub-system. The signal analyzer component can be analogous to the signal analyzer component 113 of FIG. 1 and/or the signal analyzer component 232 of FIGS. 2A-2D, while the memory sub-system can be analogous to the memory sub-system 110/210 of FIG. 1 and/or of FIGS. 2A-2D. As described above, in some embodiments, the signal analyzer component is physically distinct from a controller (e.g., the memory sub-system controller 115/215 of FIG. 1 and/or of FIGS. 2A-2D or the local media controller 135 of FIG. 1) resident on the memory sub-system; however, embodiments are not so limited and, in some embodiments, the signal analyzer component is resident on a controller that is resident on the memory sub-system.

At operation 354, the method 350 includes determining, by the signal analyzer component, relevant signals among the plurality of signals. As described above, the relevant signals can comprise a subset of signals among the plurality of signals and therefor can contain a smaller quantity of signals that a total quantity of signals of the plurality of signals.

At operation 356, the method 350 includes sampling, by the signal analyzer component, information (e.g., the information 235 illustrated in FIGS. 2A-2D, herein) corresponding to the relevant signals. As used herein, the term "sampling" generally refers to selective writing of signals (e.g., the relevant signals) to a memory resource, such as the memory resource 234 and/or the memory partition 237 of FIGS. 2A-2D. In some embodiments, the information associated with the plurality of signals comprises state information corresponding to the memory sub-system.

In some embodiments, the method 350 includes programming the signal analyzer component to distinguish the relevant signals from signals that are not relevant and sample only the relevant signals, as described above. The method 350 can further include encrypting, by the signal analyzer component, the information corresponding to the relevant signals among the plurality of signals, as described above.

The method 350 can further include controlling, by the signal analyzer component, writing of the relevant signals to one or more logs in a region of the memory sub-system that is outside a user space (e.g., the user space 238 of FIGS. 2A-2D) of the memory sub-system. As described above, the relevant signals can be written to a persistent memory (e.g., the memory resource 234 and/or the memory partition 237 of FIGS. 2A-2D) and, accordingly, the logs can be contained in a persistent memory. In such embodiments, the method 350 further includes retaining, by the signal analyzer component, the sampled relevant signals subsequent to one or more fault confirmation reboot cycles experienced by the memory sub-system, as described above.

At operation 358, the method 350 includes extracting the information corresponding to the relevant signals among the plurality of signals. In some embodiments, the method 350 includes extracting the information corresponding to the relevant signals among the plurality of signals in response to detecting a fault condition experienced by the memory sub-system, as described above.

Figure 4:
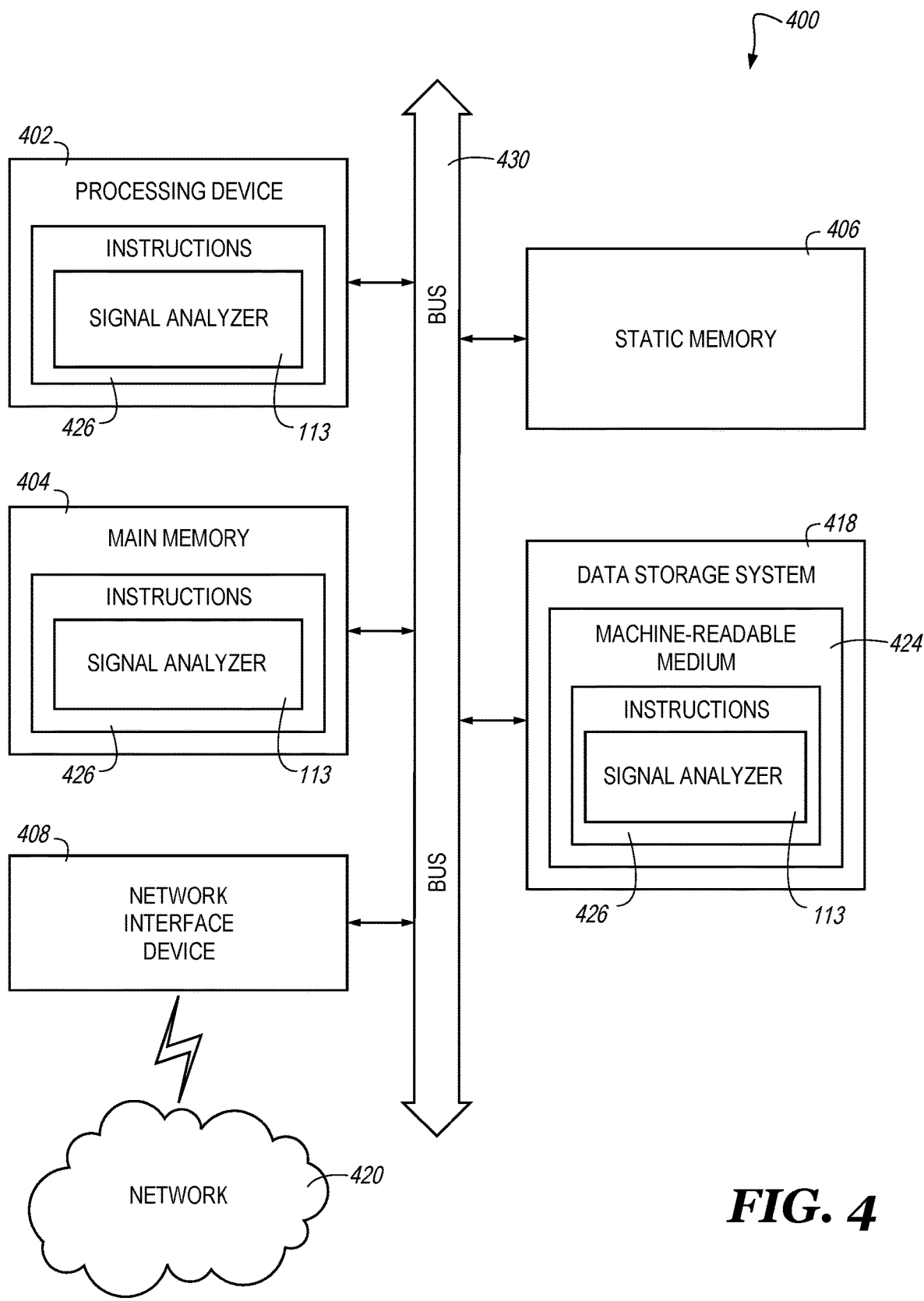
FIG. 4 is a block diagram of an example computer system in which embodiments of the present disclosure may operate.

FIG. 4 is a block diagram of an example computer system 400 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the signal analyzer component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a signal analyzer component (e.g., the signal analyzer component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   analyzing, by a signal analyzer component, a plurality of signals within a memory sub-system;
   determining, by the signal analyzer component, relevant signals among the plurality of signals, wherein the relevant signals comprise a subset of signals among the plurality of signals;
   sampling, by the signal analyzer component, information corresponding to the relevant signals;
   storing, in a memory resource of the signal analyzer component, the information corresponding to the relevant signals; and
   extracting the information corresponding to the relevant signals among the plurality of signals from the memory resource of the signal analyzer component.

2. The method of claim 1, wherein the signal analyzer component is physically distinct from a controller resident on the memory sub-system.

3. The method of claim 1, wherein the signal analyzer component is resident on a controller that is resident on the memory sub-system.

4. The method of claim 1, further comprising programming the signal analyzer component to:
   distinguish the relevant signals from signals that are not relevant; and
   sample only the relevant signals.

5. The method of claim 1, further comprising controlling, by the signal analyzer component, writing of the relevant signals to one or more logs in a region of the memory sub-system that is outside a user space of the memory sub-system.

6. The method of claim 1, further comprising encrypting, by the signal analyzer component, the information corresponding to the relevant signals among the plurality of signals.

7. The method of claim 1, further comprising retaining, by the signal analyzer component, the sampled relevant signals subsequent to one or more fault confirmation reboot cycles experienced by the memory sub-system.

8. The method of claim 1, wherein the information associated with the plurality of signals comprises state information corresponding to the memory sub-system.

9. The method of claim 1, further comprising extracting the information corresponding to the relevant signals among the plurality of signals in response to detecting a fault condition experienced by the memory sub-system.

10. An apparatus, comprising:
    a memory device resident on a memory sub-system; and
    a processing device resident on the memory sub-system and coupled to the memory device, wherein the processing device is configured to:
      analyze a plurality of signals indicative of state information of the memory device;
      determine relevant signals among the plurality of signals, wherein the relevant signals comprise a subset of signals among the plurality of signals;
      write information corresponding to the relevant signals to a memory partition of the memory device; and
      extract the information corresponding to the relevant signals among the plurality of signals from the memory partition.

11. The apparatus of claim 10, wherein the processing device is configured to extract the information corresponding to the relevant signals among the plurality of signals from the memory partition in response to a determination that a fault involving the memory sub-system has occurred.

12. The apparatus of claim 10, wherein:
    the memory partition comprises memory locations that are not within a set of memory locations that comprise a user space of the memory device, and
    the processing device is configured to write the relevant signals to one or more logs in the memory locations of the memory partition.

13. The apparatus of claim 10, wherein the memory device is a persistent memory device configured to retain the relevant signals subsequent to one or more fault confirmation reboot cycles experienced by the memory sub-system.

14. The apparatus of claim 10, wherein:
    the processing device comprises a signal analyzer component, and
    the signal analyzer component is resident on a controller that is resident on the memory sub-system.

15. The apparatus of claim 10, wherein:
    the processing device comprises a signal analyzer component, and
    the signal analyzer component is physically distinct from a controller that is resident on the memory sub-system.

16. The apparatus of claim 10, wherein the processing device is configured to encrypt the information corresponding to the relevant signals among the plurality of signals.

17. The apparatus of claim 10, wherein the processing device is configured to determine the relevant signals by determining that the relevant signals are indicative of performance of the memory sub-system, fault conditions experienceable by the memory sub-system, or both.

18. The apparatus of claim 10, further comprising a dedicated channel coupling the processing device to the memory device or the memory sub-system, or both, wherein the dedicated channel is configured to carry the plurality of signals indicative of state information between the processing device and the memory device or the memory sub-system, or both.

19. The apparatus of claim 10, further comprising a dedicated debugging channel couplable between the memory device and a host computing device external to the memory sub-system, wherein the dedicated debugging channel is configured to carry the extracted information corresponding to the relevant signals from the memory partition of the memory device to the host computing device.

20. The apparatus of claim 10, further comprising a host system coupled to the memory sub-system, wherein the processing device is configured to extract the information corresponding to the relevant signals among the plurality of signals from the memory partition to the host system.

21. A non-transitory computer-readable storage medium comprising instructions that, when executed by a processing device, cause the processing device to:
  monitor a plurality of signals indicative of state information of a memory device resident on a memory sub-system;
  analyze the plurality of signals;
  determine, based on the analysis of the plurality of signals, relevant signals among the plurality of signals, wherein the relevant signals comprise a subset of signals among the plurality of signals;
  write information corresponding to the relevant signals to a persistent memory resource associated with a signal analyzer component, wherein the signal analyzer component is resident on the memory sub-system;
  encrypt the information corresponding to the relevant signals;
  determine that a fault involving the memory sub-system has occurred; and
  extract the encrypted information corresponding to the relevant signals among the plurality of signals from the persistent memory resource.

22. The non-transitory computer-readable storage medium of claim 21, further comprising instructions that, when executed by the processing device, cause the processing device to retain the relevant signals within the persistent memory resource subsequent to one or more fault confirmation reboot cycles experienced by the memory sub-system.

23. The non-transitory computer-readable storage medium of claim 21, further comprising instructions that, when executed by the processing device, cause the processing device to determine the relevant signals based by determining that the relevant signals are indicative of performance of the memory sub-system, fault conditions experienceable by the memory sub-system, or both.

24. The non-transitory computer-readable storage medium of claim 21, further comprising instructions that, when executed by the processing device, cause the processing device to transfer the extracted encrypted information corresponding to the relevant signals from the persistent memory resource to a host computing device.

* * * * *